United States Patent
Inoue

(10) Patent No.: US 9,310,260 B2
(45) Date of Patent: Apr. 12, 2016

(54) TEMPERATURE ESTIMATION CIRCUIT AND COUNT VALUE CORRECTION CIRCUIT

(71) Applicant: Kabushiki Kaisha Toshiba, Minato-ku, Tokyo (JP)

(72) Inventor: Koichi Inoue, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/617,677

(22) Filed: Feb. 9, 2015

(65) Prior Publication Data

US 2016/0047695 A1    Feb. 18, 2016

(30) Foreign Application Priority Data

Aug. 18, 2014   (JP) .................... 2014-166021

(51) Int. Cl.
*G01K 1/02* (2006.01)
*G01K 7/00* (2006.01)

(52) U.S. Cl.
CPC ......................... *G01K 7/00* (2013.01)

(58) Field of Classification Search
None
See application file for complete search history.

(56) References Cited

U.S. PATENT DOCUMENTS

| | | | | |
|---|---|---|---|---|
| 5,638,418 A * | 6/1997 | Douglass | ............... | G01K 1/028 377/25 |
| 5,923,258 A * | 7/1999 | Tseng | .................. | G08B 21/182 340/384.1 |
| 5,977,813 A * | 11/1999 | Boerstler | ......... | H03K 19/00384 327/512 |
| 2010/0213919 A1* | 8/2010 | Takayanagi | ............. | G06F 1/206 323/318 |
| 2013/0187720 A1 | 7/2013 | Ishii | | |
| 2013/0335148 A1 | 12/2013 | Kousai et al. | | |

FOREIGN PATENT DOCUMENTS

| | | | |
|---|---|---|---|
| JP | 2006-119048 A | 5/2006 | |
| JP | 2009-065601 A | 3/2009 | |
| JP | 2013-150244 A | 8/2013 | |
| JP | 2014-017804 A | 1/2014 | |

\* cited by examiner

*Primary Examiner* — Long Nguyen
(74) *Attorney, Agent, or Firm* — White & Case LLP

(57) ABSTRACT

According to one embodiment, a temperature estimation circuit includes a first oscillator, a second oscillator, an enable period setting unit, a first counter, a first memory, a second memory, and an operation unit. The operation unit executes a computation to calculate an operation temperature based on an operation-time count value that is outputted from the first counter during a normal operation, the first count value, and the second count value.

17 Claims, 12 Drawing Sheets

| FREQUENCY | TEMPERATURE COEFFICIENT | t1 | t2 | t3 | ... | ty |
|---|---|---|---|---|---|---|
| f1 | k1 | c111 | c112 | c113 | | |
| | k2 | c121 | c122 | c123 | | |
| | k3 | c131 | c132 | c133 | | |
| f2 | k1 | c211 | c212 | c213 | | |
| | k2 | c221 | c222 | c223 | | |
| | k3 | c231 | c232 | c233 | | |
| f3 | k1 | c311 | c312 | c313 | | |
| | k2 | c321 | c322 | c323 | | |
| | k3 | c331 | c332 | c333 | | |
| ..... | | | | | | |
| fx | k1 | | | | | |
| | k2 | | | | | |
| | k3 | | | | | |

Fig. 8

TEMPERATURE ESTIMATION CIRCUIT AND COUNT VALUE CORRECTION CIRCUIT

CROSS REFERENCE TO RELATED APPLICATION

This application is based upon and claims the benefit of priority from the prior Japanese Patent Application No. 2014-166021, filed on Aug. 18, 2014, the entire contents of which are incorporated herein by reference.

FIELD

Embodiments described herein relate to a temperature estimation circuit and a count value correction circuit.

BACKGROUND

Silicon oscillators have conventionally been used in which an oscillation element is formed of a silicon wafer by a semiconductor manufacturing technique. A silicon oscillator is lower in cost and easier to be downsized than a crystal oscillator, but has a problem of a large fluctuation of frequency due to the temperature.

Therefore, in a semiconductor integrated circuit that incorporates a silicon oscillator and a counter using the oscillating frequency of the silicon oscillator as a clock, an operation temperature of the semiconductor integrated circuit is estimated, and a count value of the counter is corrected in accordance with the estimated temperature.

In this process, the correction is required to be performed by considering a large characteristic fluctuation of the semiconductor element due to manufacturing variations.

BRIEF DESCRIPTION OF THE DRAWINGS

FIG. 8 is a view illustrating a structure of a correction value table 26 according to the second embodiment;

DETAILED DESCRIPTION

Figure 1:
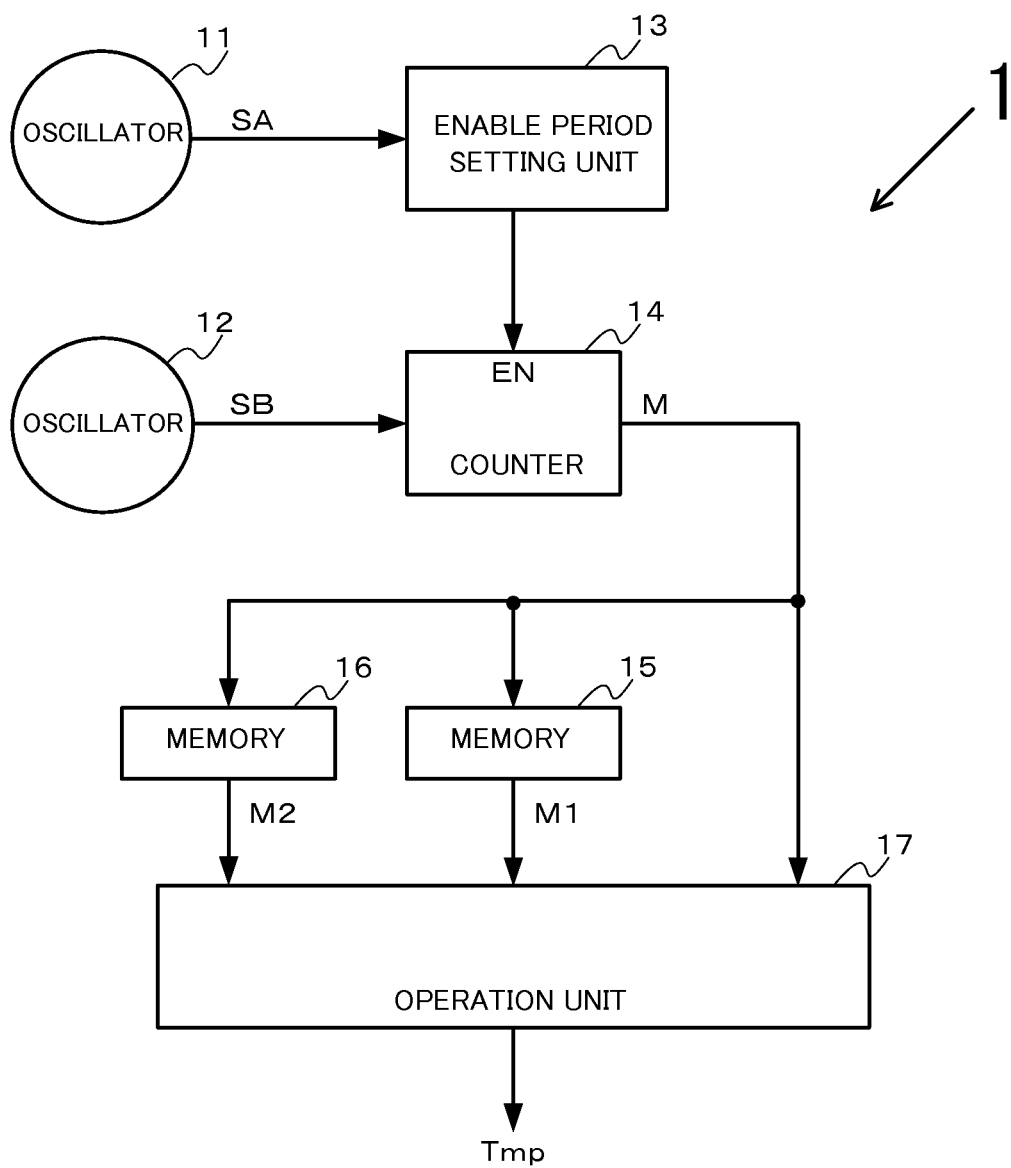
FIG. 1 is a block diagram illustrating a configuration example of a temperature estimation circuit according to a first embodiment.

According to one embodiment, a temperature estimation circuit includes a first oscillator, a second oscillator, an enable period setting unit, a first counter, a first memory, a second memory, and an operation unit. The first oscillator generates a first oscillating signal having a smaller temperature-related change rate of the oscillating frequency than a predetermined value and having a small temperature-related change. The second oscillator generates a second oscillating signal having an oscillating frequency linearly changing with respect to the temperature. The enable period setting unit sets a count period for a predetermined number of oscillations of the first oscillating signal as an enable period. The first counter counts the number of oscillations of the second oscillating signal during the enable period. The first memory stores therein a count output value that is outputted from the first counter when a test at a first temperature is performed, as a first count value. The second memory stores therein a count output value that is outputted from the first counter when a test at a second temperature is performed, as a second count value. The operation unit executes a computation to calculate an operation temperature based on an operation-time count value that is outputted from the first counter during a normal operation, the first count value, and the second count value.

Hereinafter, a plurality of embodiments will be further described with reference to the drawings. In the drawings, the same reference numerals indicate the same or the similar portions.

A temperature estimation circuit according to a first embodiment will be described with reference to the drawings. FIG. 1 is a block diagram illustrating a configuration example of the temperature estimation circuit.

As shown in FIG. 1, a temperature estimation circuit 1 includes an oscillator 11, an oscillator 12, an enable period setting unit 13, a counter 14 (first counter), a memory 15 (first memory), a memory 16 (second memory), and an operation unit 17. The oscillator 11 generates an oscillating signal SA (first oscillating signal) having a smaller temperature-related change rate of the oscillating frequency than a predetermined value and having a small temperature-related change. The oscillator 12 generates an oscillating signal SB (second oscillating signal) having an oscillating frequency linearly changing with respect to the temperature. The enable period setting unit 13 sets a count period for a predetermined number of the oscillating signals SA from the oscillator 11 as an enable period EN. The counter 14 counts the number of oscillations of the oscillating signal SB from the oscillator 12 during the enable period EN. The memory 15 stores therein a count value M that is outputted from the counter 14 when a test at a first temperature T1 is performed, as a first count value M1. The memory 16 stores therein a count value M that is outputted from the counter 14 when a test at a second temperature T2 is performed, as a second count value M2. The operation unit 17 executes a computation to calculate an operation temperature Tmp based on an operation-time count value M that is outputted from the counter 14 during a normal operation, the first count value M1 that is read out from the memory 15, and the second count value M2 that is read out from the memory 16.

Here, the temperature estimation circuit 1 is a silicon semiconductor integrated circuit formed on a silicon substrate by a semiconductor manufacturing technique. The temperature estimation circuit 1 is configured to include a silicon semiconductor integrated circuit having a single chip or a silicon semiconductor integrated circuit having a plurality of chips. A silicon oscillator is used for the oscillator 11 and the oscillator 12.

Figure 2:
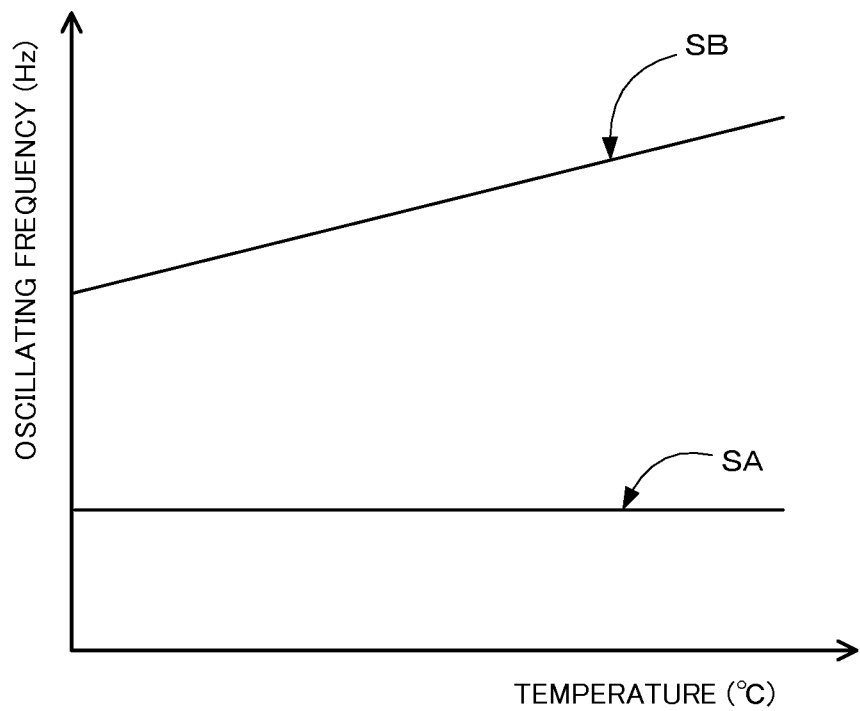
FIG. 2 is a graph illustrating an example of temperature characteristics of the oscillating frequencies of an oscillator 11 and an oscillator 12 according to the first embodiment.

FIG. 2 is a graph illustrating an example of temperature characteristics of the oscillating frequency of the oscillator 11 and the oscillator 12.

As shown in FIG. 2, the oscillating frequency of the oscillating signal SB from the oscillator 12 linearly changes with respect to the temperature. In contrast, the oscillating frequency of the oscillating signal SA from the oscillator 11 has a smaller change rate relative to the temperature change than a predetermined value (for example, smaller than a predetermined value of 1%), and has a small temperature-related change. The enable period EN that is generated by counting a predetermined number of oscillations of the oscillating signal SA from the oscillator 11 has a small change rate even when the temperature changes.

Accordingly, during the enable period EN, an output count value of the counter 14 that counts the number of oscillations of the oscillating signal SB from the oscillator 12 linearly changes with respect to the temperature.

Figure 3:
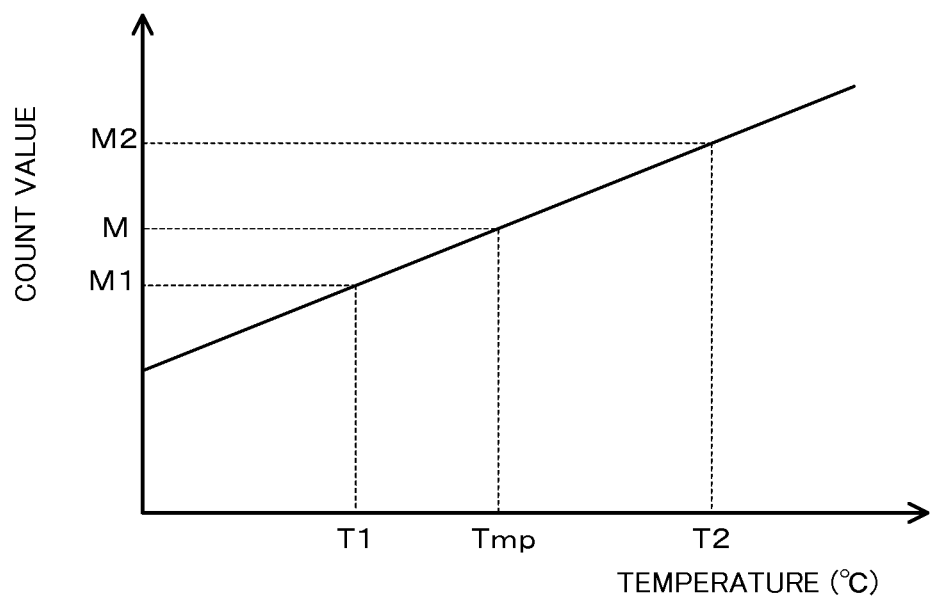
FIG. 3 is a graph illustrating an example of a temperature characteristic of a count value of a counter 14 according to the first embodiment.

FIG. 3 illustrates a relation between the output count value of the counter 14 and the temperature.

The output count value of the counter 14 changes in proportion to the temperature change. In the embodiment, an operation temperature is estimated using the relation between the output count value and the temperature.

In the embodiment, a temperature test is performed in advance, and an output count value of the counter 14 at the temperature test is stored. An output from the counter 14 during a test at the first temperature T1 is stored in the memory 15 as the first count value M1. An output from the counter 14 during a test at the second temperature T2 is stored in the memory 16 as the second count value M2.

The memory 15 and the memory 16 are nonvolatile semiconductor memory devices, such as flash memories, and the stored contents are held after the temperature tests have been finished.

FIG. 3 illustrates a relation between the first count value M1 and the second count value M2, and the temperatures T1 and T2. As shown in FIG. 3, a change of the count value from the first count value M1 to the second count value M2 is in proportion to a change of temperature from the temperature T1 to the temperature T2.

When a change coefficient with respect to the temperature of the count value of the counter 14 is set as k, a temperature coefficient k can be obtained as follows.

$$k=(M2-M1)/(T2-T1) \quad \text{expression (1)}$$

In the embodiment, after a temperature test is performed in advance, a temperature estimation circuit is caused to operate. When a count value of the counter 14 during the operation is set as an operation-time count value M, a relation between the operation-time count value M and an operation temperature Tmp in this process as shown in FIG. 3 is present.

When the operation temperature Tmp, the temperature T1, and the temperature coefficient k are used, the operation-time count value M can be represented as follows.

$$M=M1+k\times(\text{Tmp}-T1) \quad \text{expression (2)}$$

Accordingly, when the operation temperature Tmp is obtained from the expression (1) and the expression (2), the operation temperature Tmp can be represented as follows.

$$\text{Tmp}=T1+1/k\times(M-M1)=T1+1[\{(T2-T1)\times(M-M1)\}/(M2-M1)] \quad \text{expression (3)}$$

Figure 4:
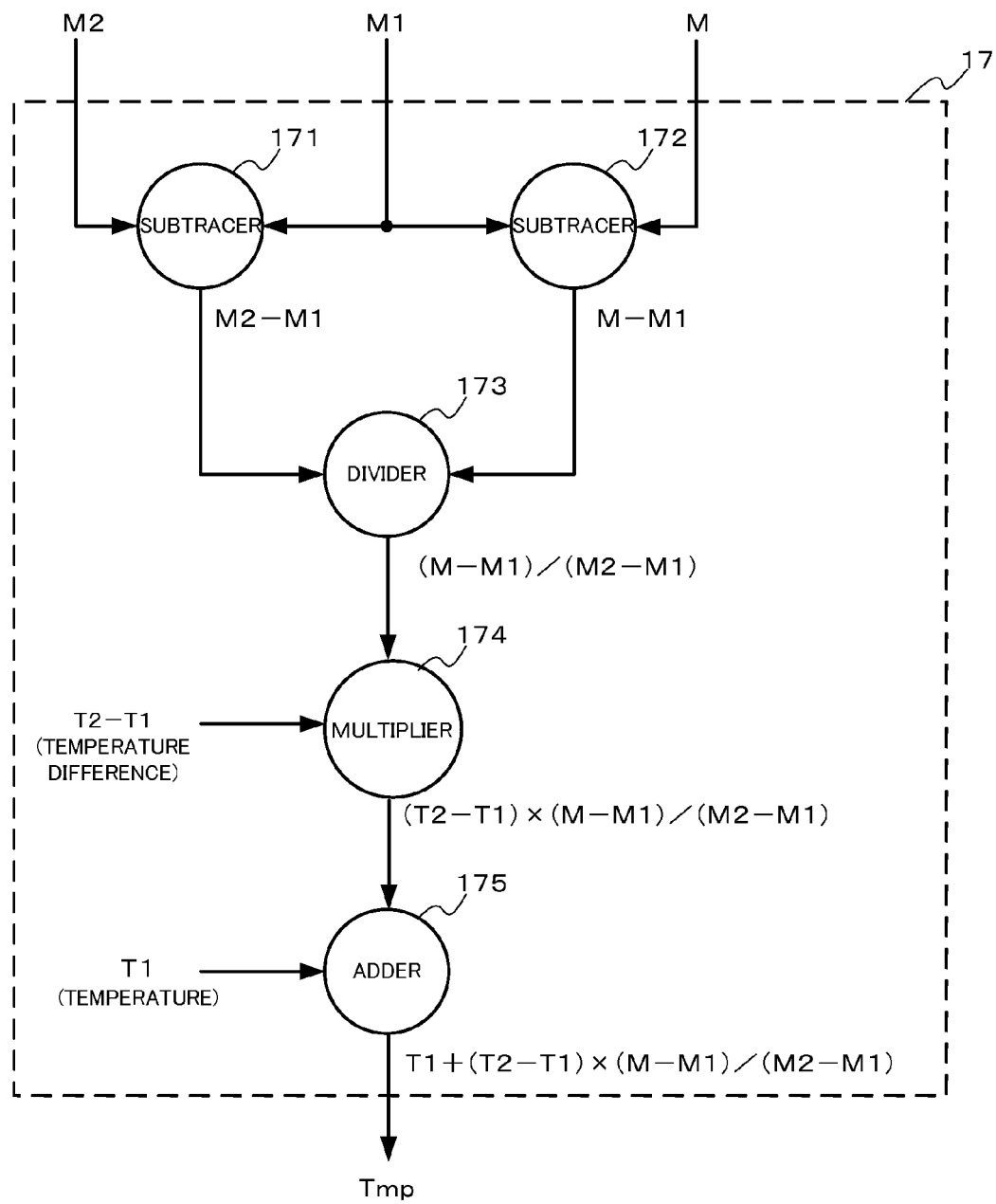
FIG. 4 is a block diagram illustrating an example of an inner structure of an operation unit 17 according to the first embodiment.

FIG. 4 is a block diagram illustrating the operation unit 17 that executes a computation to obtain the operation temperature Tmp.

As shown in FIG. 4, the operation unit 17 includes a subtracter 171 (first subtracter), a subtracter 172 (second subtracter), a divider 173, a multiplier 174, and an adder 175 (first adder). The subtracter 171 calculates (M2−M1). The subtracter 172 calculates (M−M1). The divider 173 calculates (M−M1)/(M2−M1) based on the outputs from the subtracter 171 and the subtracter 172. The multiplier 174 calculates (T2−T1)×(M−M1)/(M2−M1) by multiplying the output from the divider 173 by a temperature difference (T2−T1). The adder 175 calculates T1+(T2−T1)×(M−M1)/(M2−M1) by adding the temperature T1 to an output from the multiplier 174.

The values of the temperature difference (T2−T1) and the temperature T1 are written in advance in a register, which is not illustrated, for example.

An output from the adder 175 is an estimation value of the operation temperature Tmp.

With the embodiment, the operation temperature can be estimated by using two oscillators having different temperature characteristics of the oscillating frequency.

Moreover, in the embodiment, data is calculated and stored after a temperature test is performed in advance. For the reason, it is possible to estimate an operation temperature using the data.

The oscillator 11 used in the temperature estimation circuit 1 according to the first embodiment described above has a smaller temperature-related change rate of the oscillating frequency than a predetermined value, and the oscillating signal SA has a small temperature-related change. Thus, causing the counter to be operated using the oscillating signal SA as a clock allows approximate accurate time measurement to be performed. However, the oscillator 11 has a slight fluctuation of the oscillating frequency of which temperature-related change rate is smaller than 1%. The oscillator 11 also has an original fluctuation of the oscillating frequency due to manufacturing variations and the like. Thus, an error also occurs in an output from the counter that uses the oscillating signal SA as a clock. A second embodiment indicates a count value correction circuit capable of correcting an error of a count value due to a fluctuation of the oscillating frequency.

A count value correction circuit according to the second embodiment will be described with reference to the drawings.

Figure 5:
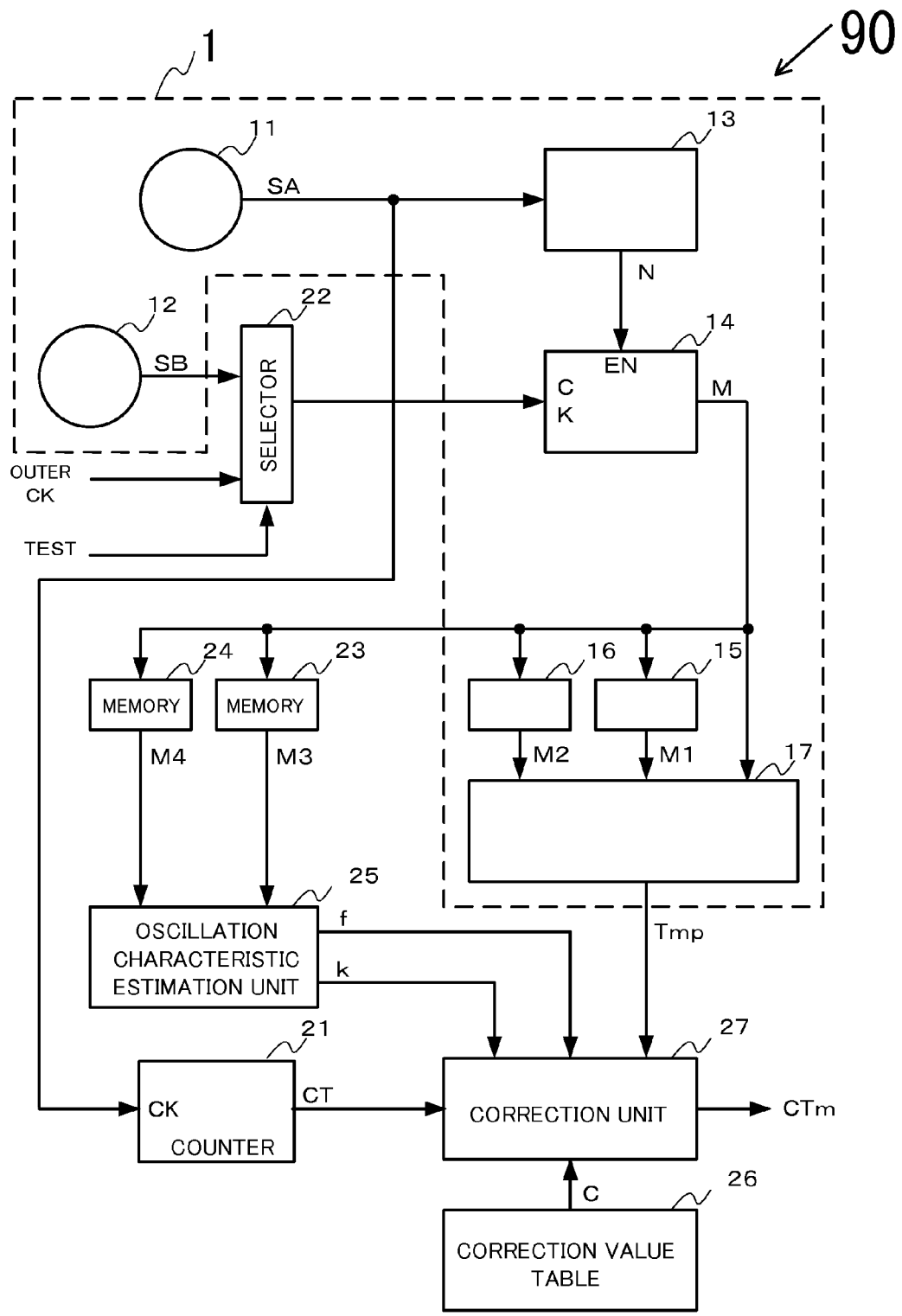
FIG. 5 is a block diagram illustrating a configuration of a count value correction circuit according to a second embodiment.

FIG. 5 is a block diagram illustrating a configuration of a count value correction circuit. Hereinafter, the same reference numerals are assigned to the same constitute portions as the first embodiment, explanations thereof are omitted, and only different portions will be described.

As shown in FIG. 5, a count value correction circuit 90 includes the temperature estimation circuit 1, a counter 21 (second counter), a selector 22 (first selector), a memory 23 (third memory), a memory 24 (fourth memory), an oscillation characteristic estimation unit 25, a correction value table 26, and a correction unit 27.

The counter 21 counts the number of oscillations of the oscillating signal SA from the oscillator 11. The selector 22 selects whether the oscillating signal SB from the oscillator 12 or an outside CK (third oscillating signal) that is an outside oscillating signal inputted from the outside and having no temperature fluctuation, is inputted into the counter 14.

When the test at the first temperature T1 is performed, the selector 22 selects the outside CK and the memory 23 stores therein a count value of the counter 14 during the enable period EN as a third count value M3. When the test at the second temperature T2 is performed, the selector 22 selects the outside CK and the memory 24 stores therein a count value of the counter 14 during the enable period EN as a fourth count value M4.

A correction value C for each temperature is described in the temperature correction value table 26. The correction value C is used to correct a shift of a count value CT of the counter 21 when the oscillating frequency of the oscillator 11 that estimates a reference oscillating frequency f of the oscillator 11 at a reference temperature and a temperature coefficient k of the reference oscillating frequency f based on the third count value M3 read out from the memory 23 and the fourth count value M4 read out from the memory 24 fluctuates from a reference frequency fc.

The correction unit 27 reads out a correction value C corresponding to a combination of the reference oscillating frequency f and temperature coefficient k that are estimated by the oscillation characteristic estimation unit 25, and the operation temperature Tmp that is outputted from the temperature estimation circuit 1, from the correction value table 26, and corrects the count value CT of the counter 21.

Here, the count value correction circuit 90 is a silicon semiconductor integrated circuit formed on a silicon substrate by a semiconductor manufacturing technique. The count value correction circuit 90 is configured to include a silicon semiconductor integrated circuit having a single chip or a silicon semiconductor integrated circuit having a plurality of chips.

The counter 21 is a counter that counts the number of oscillations of the oscillating signal SA from the oscillator 11, and outputs the count value CT.

Figure 6:
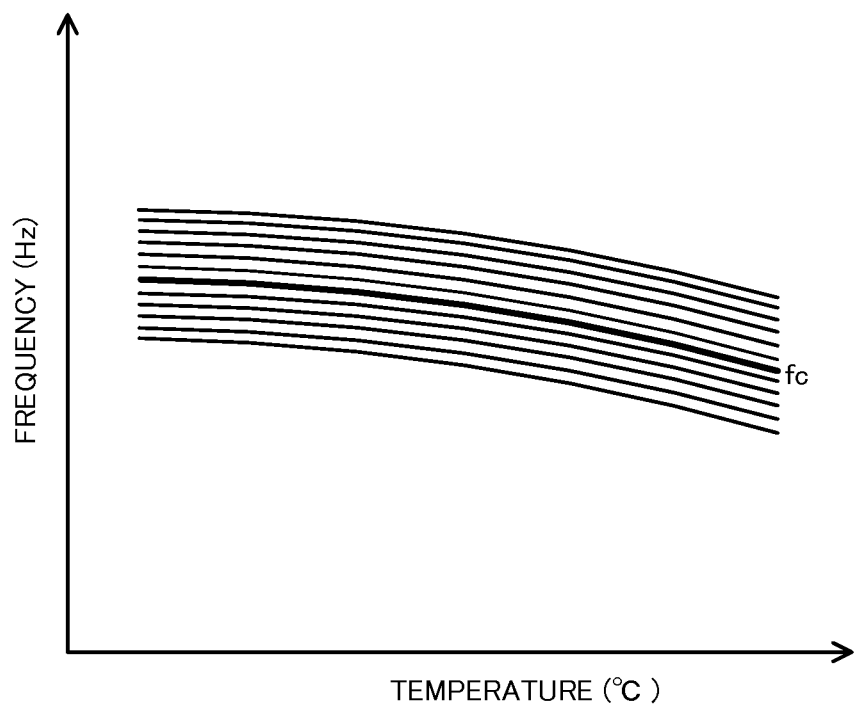
FIG. 6 is a graph illustrating fluctuations of the oscillating frequency and the temperature characteristic of oscillator 11 according to the second embodiment.

FIG. 6 illustrates an example in which a temperature characteristic of the oscillating frequency of the oscillator 11 is precisely measured. The oscillating frequency of the oscillator 11 is approximately stable with respect to the temperature change, however, the oscillating frequency has a temperature fluctuation characteristic as shown in FIG. 6 if being precisely measured. The oscillating frequency fluctuates from a reference frequency fc due to manufacturing variations and the like. A temperature coefficient of the oscillating frequency change tends to be approximate constant regardless of the oscillating frequency being fluctuated.

In the embodiment, in order to correct a shift of the count value CT of the counter 21 due to the fluctuation of the oscillating frequency of the oscillator 11, the temperature estimation circuit 1 estimates an operation temperature Tmp, and obtains a correction value in accordance with the operation temperature Tmp.

Also in the embodiment, in order that the temperature estimation circuit 1 estimates an operation temperature Tmp, a temperature test is performed in advance, and an output from the counter 14 when a test at the first temperature T1 is performed is stored in the memory 15 as the first count value M1. An output from the counter 14 when a test at the second temperature T2 is performed is stored in the memory 16 as the second count value M2.

In the embodiment, when the abovementioned temperature test is performed, a test to acquire temperature fluctuation data on the oscillating frequency of the oscillator 11 is also performed.

In the embodiment, the selector 22 is provided. The selector 22 selects whether the oscillating signal SB from the oscillator 12 or the outside CK inputted from the outside is inputted into the counter 14.

When acquiring temperature fluctuation data on the oscillating frequency of the oscillator 11, the selector 22 performs switching using a test signal TEST to input the outside CK into the counter 14. The outside CK is an oscillating signal having a considerably higher oscillating frequency than that of the oscillator 11 and a less temperature fluctuation.

As shown in FIG. 6, the frequency of the oscillating signal SA from the oscillator 11 fluctuates. The enable period EN that is set by the enable period setting unit 13 at a temperature test in which the outside CK is inputted into the counter 14 fluctuates in accordance with the frequency fluctuation of the oscillating signal SA. The frequency of the oscillating signal SA higher than the reference frequency fc results in the short enable period EN, whereas the frequency of the oscillating signal SA lower than the reference frequency fc results in the long enable period EN.

In a case where the counter 14 is caused to operate by the outside CK being inputted into the counter 14, a temperature coefficient of fluctuation of the count value M has a relation of a reversed plus or minus sign relative to a temperature coefficient of the frequency fluctuation of the oscillating signal SA.

The temperature coefficient of the frequency fluctuation of the oscillating signal SA is not necessarily constant due to manufacturing variations and the like. Thus, evaluation of a variation sample the oscillating frequency of the oscillator 11 is performed in advance, and the tendency of fluctuations of the oscillating frequency is classified into three types, for example, and a temperature coefficient for each type is previously obtained.

Figure 7A:
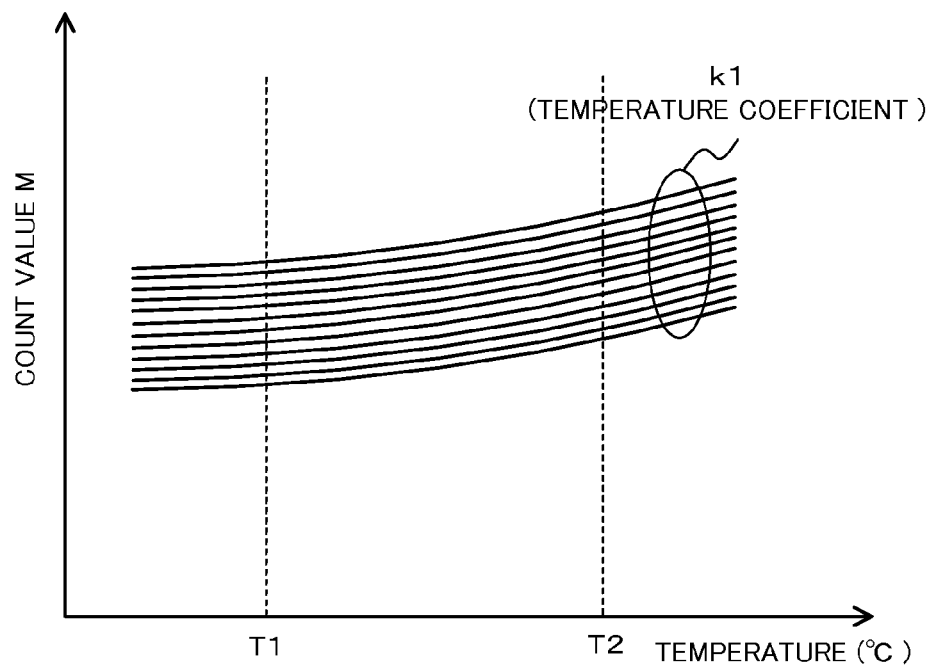
FIG. 7A is a graph illustrating a relation between a temperature coefficient of the oscillating frequency change of the oscillator 11 due to the temperature change and a change of the count value of the counter 14, the fluctuation of the oscillating frequency of the oscillator 11 being classified into a type of a temperature coefficient k1.
Figure 7B:
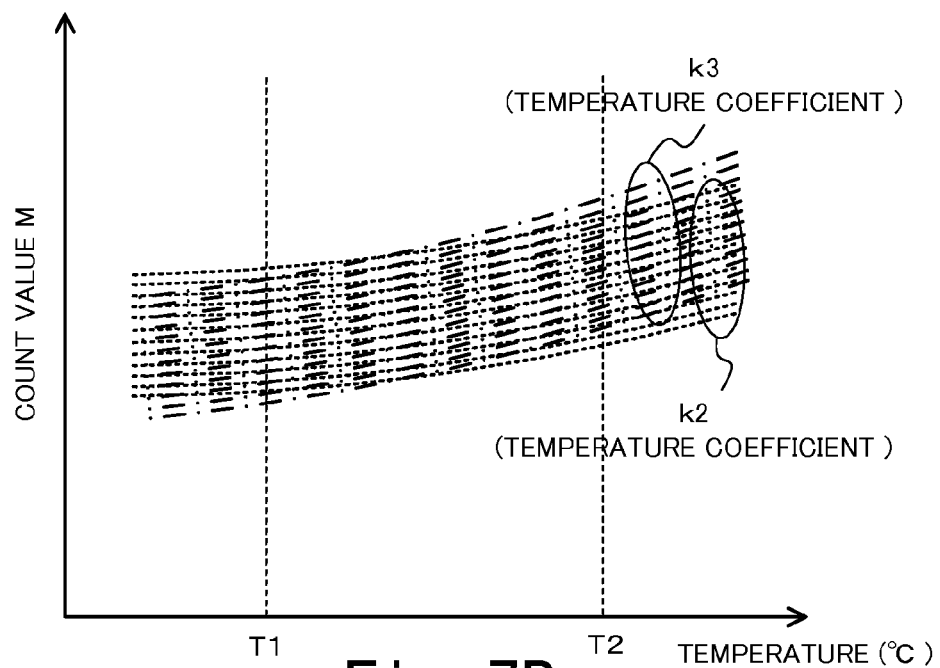
FIG. 7B is a graph illustrating a relation between a temperature coefficient of the oscillating frequency change of the oscillator 11 due to the temperature change and a change of the count value of the counter 14, the fluctuation of the oscillating frequency of the oscillator 11 being classified into types of temperature coefficients k2 and k3.

FIG. 7A and FIG. 7B illustrate examples of a change of the count value M of the counter 14 with respect to the temperature when a temperature test is performed by the outside CK being inputted.

FIG. 7A is an example illustrating a result of a temperature test in which the fluctuation of the oscillating frequency of the oscillator 11 is classified into a type of a temperature coefficient k1. FIG. 7B is an example illustrating a result of a temperature test in which the fluctuation of the oscillating frequency of the oscillator 11 is classified into temperature coefficients k2 and k3.

In the embodiment, in order to grasp the type to which the fluctuation of the oscillating frequency of the oscillator 11 belongs, the memory 23, the memory 24, and the oscillation characteristic estimation unit 25 are provided.

The memory 23 stores therein a count value of the counter 14 into which the outside CK is inputted when the temperature test at the first temperature T1 is performed, as the third count value M3.

The memory 24 stores therein a count value of the counter 14 into which the outside CK is inputted when the temperature test at the second temperature T2 is performed as the fourth count value M4.

Here, the memory 23 and the memory 24 are nonvolatile semiconductor memory devices, such as flash memories, and the stored contents are held after the temperature tests have been finished.

The oscillation characteristic estimation unit 25 estimates a reference oscillating frequency f of the oscillator 11 at a reference temperature and a temperature coefficient k of the reference oscillating frequency f, based on the third count value M3 read out from the memory 23 and the fourth count value M4 read out from the memory 24.

When the reference temperature is set to the first temperature T1, the reference oscillating frequency f of the oscillator 11 at the reference temperature can be immediately obtained from the third count value M3. When the number of counts of the oscillating signal SA to set the enable period EN is set as N and the frequency of the outside CK is set as fex, the reference oscillating frequency f of the oscillator 11 at the reference temperature can be obtained as follows.

$$f = N/M3 \times fex \qquad \text{expression (4)}$$

The oscillation characteristic estimation unit 25 checks the third count value M3 and the fourth count value M4, and a difference value (M4−M3) against count values M at the temperatures T1, T2 and a difference value, for example, in the graph of the three types of the temperature characteristics shown in FIG. 7, and determines the type of the temperature characteristic of which values are most closet to the values, in order to estimate the temperature coefficient k.

The oscillation characteristic estimation unit 25 outputs any one of the temperature coefficients k1, k2, and k3 of the respective types as a temperature coefficient k, based on the determination result.

As described above, when the reference oscillating frequency f at the reference temperature and the temperature coefficient k can be estimated, a change of the oscillating frequency of the oscillator 11 with respect to the temperature can be estimated based on the evaluation result of the variation sample of the oscillating frequency.

A shift of the count value CT of the counter 21 from the count value at the reference frequency fc can be also calculated from the oscillating frequency at each temperature.

In the embodiment, a correction value used to correct a shift from the count value for each temperature is obtained in advance, and is previously described in the correction value table 26.

FIG. 8 illustrates a structure of the correction value table 26.

As shown in FIG. 8, correction values C (c111, c112, c113, . . . ) for each temperature (t1, t2, t3, . . . ty) corresponding to combinations of the reference oscillating frequency f (f1, f2, f3, . . . fx) at the reference temperature and the temperature coefficients k (k1, k2, k3) that are outputted from the oscillation characteristic estimation unit 25, are described.

Figure 9:
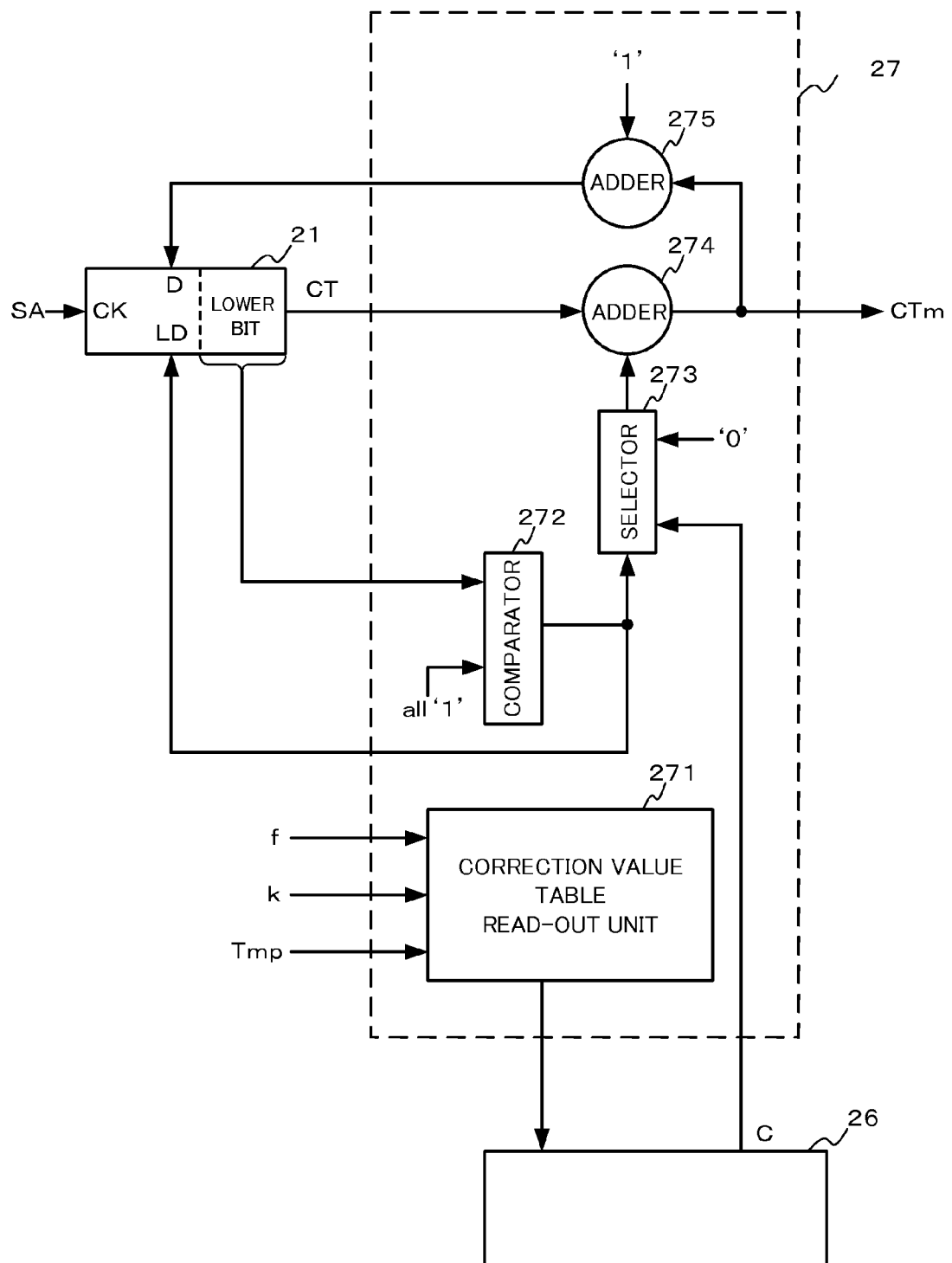
FIG. 9 id a block diagram illustrating an example of an inner structure a correction unit 27 according to the second embodiment.

FIG. 9 is a block diagram illustrating an inner structure of the correction unit 27. The correction unit 27 corrects the count value CT when the values for the lower n bits in the counter 21 become the values of all "1" (all "1").

The counter 21 is a counter with a load function, and reads in data inputted into a data terminal D when a load signal is inputted into a load terminal LD.

As shown in FIG. 9, the correction unit 27 includes a correction value table read-out unit 271, a comparator 272, a selector 273 (second selector), an adder 274 (second adder), and an adder 275 (third adder).

The reference oscillating frequency f and the temperature coefficient k that are outputted from the oscillation characteristic estimation unit 25, and the operation temperature Tmp that is outputted from the temperature estimation circuit 1 are inputted into the correction value table read-out unit 271. The correction value table read-out unit 271 reads out a correction value C corresponding to a combination of the reference oscillating frequency f and the temperature coefficient k, and the operation temperature Tmp, from the correction value table 26.

The comparator 272 determines whether the values for the lower n bits in the counter 21 are all "1". The selector 273 selects the correction value C that is read out from the correction value table 26 or "0 (zero)" based on an output from the comparator 272. The adder 274 adds an output from the selector 273 to the count value CT of the counter 21 to obtain and output a count value CTm after correction. The adder 275 adds "1" to the output from the adder 274, and outputs an addition result to the data terminal D of the counter 21. The comparator 272 also outputs the determination result to the load terminal LD of the counter 21.

The correction unit 27 operates as follows.

The comparator 272 compares the values for the lower n bits in the counter 21 with all "1", and outputs a correspondence signal when the values for the lower n bits become all "1".

The selector 273 selects a correction value C when the comparator 272 outputs the correspondence signal, and outputs the correction value C to the adder 274. The selector 273 selects "0 (zero)" when the comparator 272 outputs no correspondence signal.

The adder 274 adds the output from the selector 273 to the count value CT of the counter 21 to obtain and output a count value CTm after correction. Accordingly, when the comparator 272 outputs the correspondence signal, the count value CTm after correction is obtained as follows.

$$CTm = CT + C$$

The count value CT of the counter 21 is corrected to a value when the oscillating frequency of the oscillator 11 is the reference frequency fc.

In contrast, a relation CTm=CT is obtained when the comparator 272 outputs no correspondence signal, so that the adder 274 outputs the count value CT of the counter 21 without any change.

When the count value CT of the counter 21 is corrected to a value of CTm=CT+C, the value of CTm is required to be returned to the counter 21. The correspondence signal outputted from the comparator 272 is used as a load signal for the counter 21, and a value by adding "1" to the value of CTm by the adder 275 is loaded to the counter 21. As a result, the counter 21 starts to count from CTm+1 when a next clock is inputted.

As described above, in the embodiment, the count value CT is corrected when the values for the lower n bits in the counter 21 become all "1". A cycle for the correction varies depending on the oscillating frequency of the oscillator 11.

Figure 10:
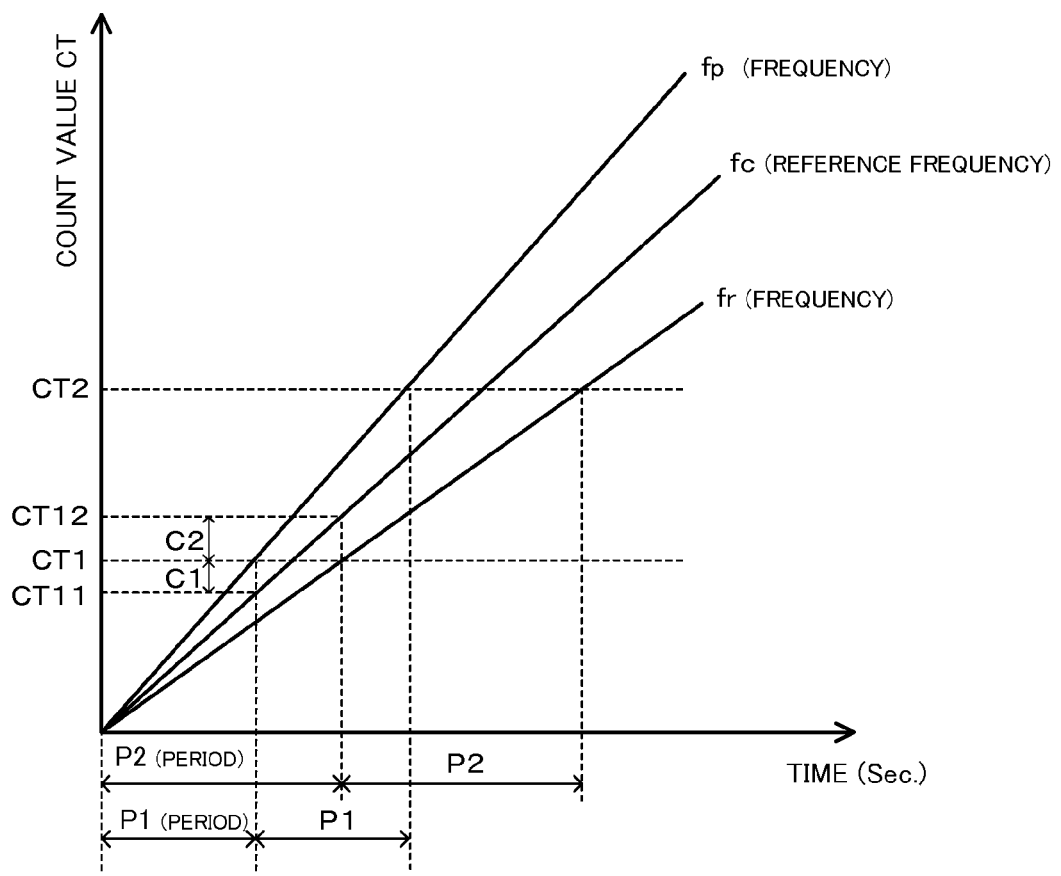
FIG. 10 is a graph illustrating a relation between the oscillating frequency of the oscillator 11 and the count value of the counter 21 according to the second embodiment.

FIG. 10 illustrates a relation between the oscillating frequency of the oscillator 11 and the cycle in which the values for the lower n bits in the counter 21 become all "1". In FIG.

10, count values CT1, CT2 are respectively count values when the values for the lower n bits in the counter 21 become the values of all "1".

In a case of a frequency fp where the oscillating frequency of the oscillator 11 fluctuates toward a higher frequency side than the reference frequency fc, the values for the lower n bits in the counter 21 become all "1" in a cycle P1.

In contrast, in a case of a frequency fr where the oscillating frequency of the oscillator 11 fluctuates toward a lower frequency side than the reference frequency fc, the values for the lower n bits in the counter 21 become the values of all "1" in a cycle P2.

The cycle P2 is longer than the cycle P1. The lower oscillating frequency of the oscillator 11 results in the longer cycle in which the values for the lower n bits in the counter 21 become the values of all "1". The lower oscillating frequency of the oscillator 11 also results in the longer cycle in which the count value CT of the counter 21 is corrected.

FIG. 10 illustrates a relation with count values in the reference frequency fc at a time when the count value CT1 of the counter 21 is corrected.

Herein, a count value in the reference frequency fc at a time when a correction in the frequency fp is performed is represented as CT11, and a count value in the reference frequency fc at a time when a correction in the frequency fr is represented as CT12.

When a difference between the count values in the reference frequency fc and the frequency fp is set as C1 and a difference between the count values in the reference frequency fc and the frequency fr is set as C2, C1, C2 are expressed as follows.

$$C1 = CT11 - CT1$$

$$C2 = CT12 - CT1$$

In the embodiment, C1 and C2 are respectively described in the correction value table 26 as a correction value for the frequency fp and a correction value for the frequency fr.

The relations CT11<CT1 and CT12>CT1 are satisfied, so that the correction value C1 becomes minus and the correction value C2 becomes plus.

Figure 11A:
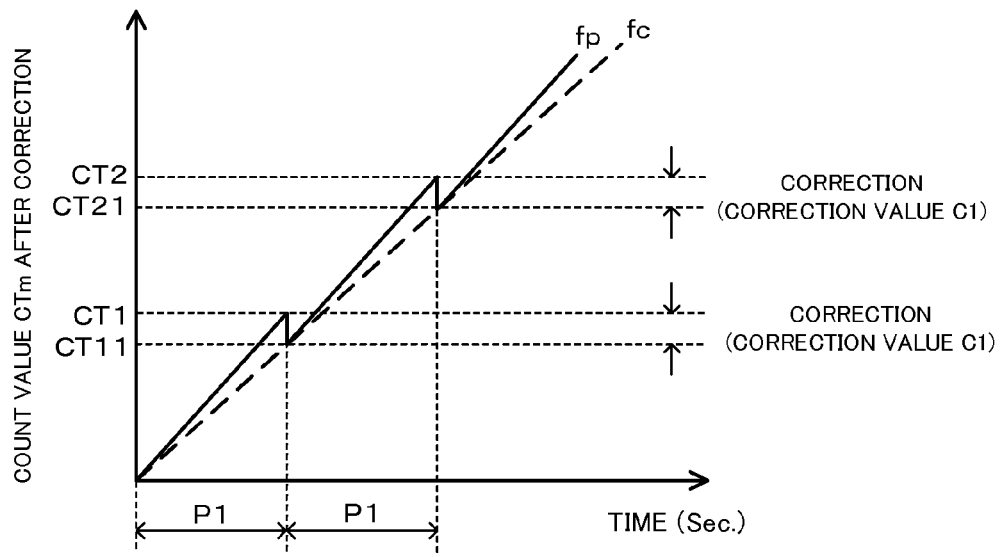
FIG. 11A is a graph illustrating a change of a count value CTm after correction in a case of a frequency fp where the oscillating frequency of the oscillator 11 is higher than a reference frequency fc.
Figure 11B:
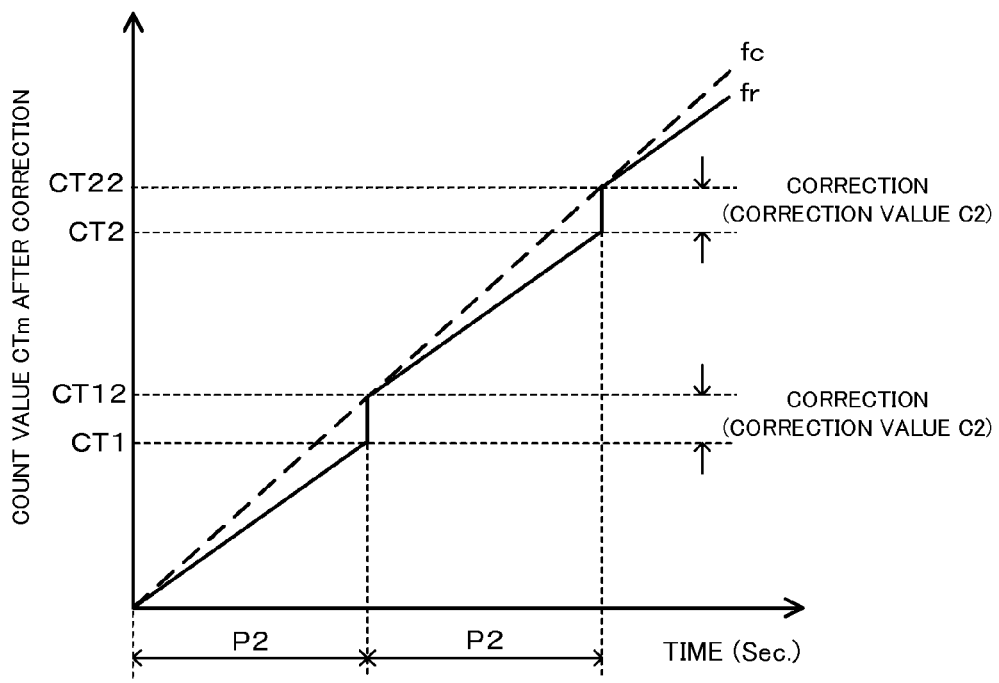
FIG. 11B is a graph illustrating a change of a count value CTm after correction in a case of a frequency fr where the oscillating frequency of the oscillator 11 is lower than the reference frequency fc.

FIGS. 11A and 11B illustrate examples of a correction operation by the correction unit 27.

FIG. 11A illustrates a change state of the count value CTm after correction when the oscillating frequency of the oscillator 11 is the frequency fp that is higher than the reference frequency fc.

The count value CT of the counter 21 is corrected in the correction cycle P1 shown in FIG. 10. The correction with the correction value C1 for the frequency fp that is read out from the correction value table 26 is performed in the correction timing, and the count value CTm after correction becomes a count value in the reference frequency fc.

FIG. 11B illustrates a change state of the count value CTm after correction when the oscillating frequency of the oscillator 11 is the frequency fr that is lower than the reference frequency fc.

The count value CT of the counter 21 is corrected in the cycle P2 shown in FIG. 10. The correction with the correction value C2 for the frequency fr that is read out from the correction value table 26 is performed in the correction timing, and the count value CTm after correction becomes a count value in the reference frequency fc.

As described above, in the embodiment, the count value CT of the counter 21 is corrected in a cycle in which the values for the lower n bits in the counter 21 become the values of all "1". Accordingly, the correction cycle changes depending on the number of n bits.

Figure 12A:
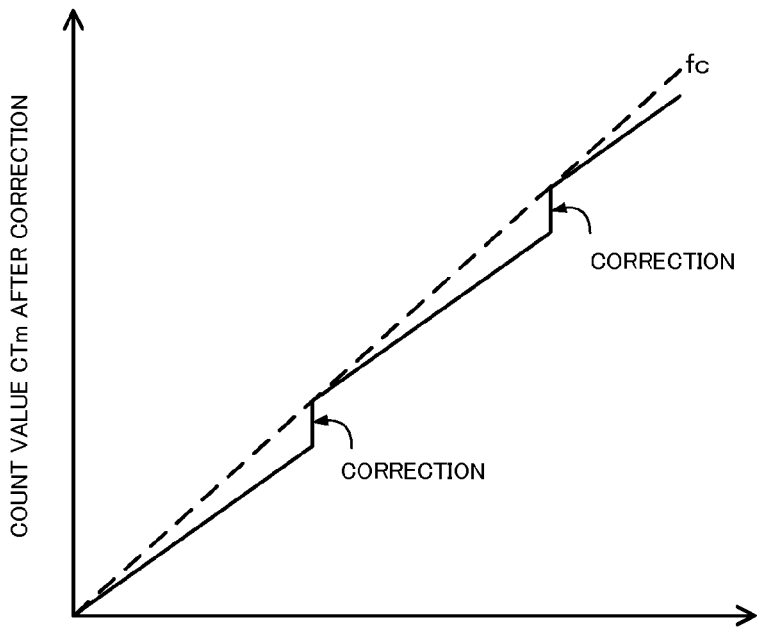
FIG. 12A is a graph illustrating a relation between the number of the lower n bits in the counter 21 and a correction cycle when the number of n bits is n1.
Figure 12B:
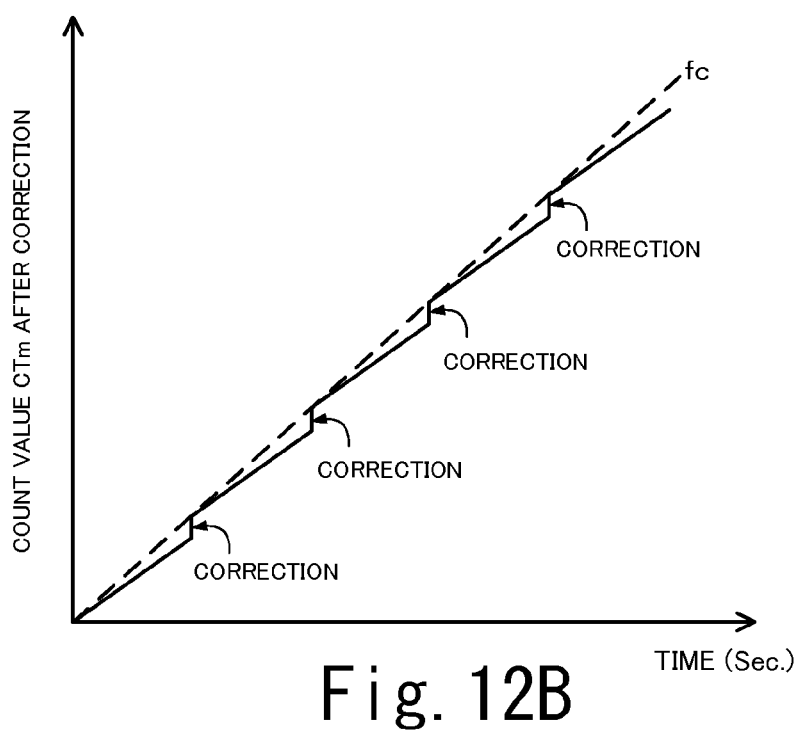
FIG. 12B is a graph illustrating a relation between the number of the lower n bits in the counter 21 and a correction cycle when the number of n bits satisfies n2(n2<n1).

FIGS. 12A and 12B each illustrate a relation between the number of n bits and the correction cycle. FIG. 12A is a graph illustrating a relation between the number of the lower n bits in the counter 21 and the correction cycle when the number of n bits is n1. FIG. 12B is a graph illustrating a relation between the number of the lower n bits in the counter 21 and a correction cycle when the number of n bits satisfies n2(n2<n1).

As shown in FIGS. 12A and 12B, the smaller number of n bits results in the shorter correction cycle. This can reduce a shift of the count value CT of the counter 21 from the count value in the reference frequency fc.

As described above, with the embodiment, a shift of a count value from a count value in the reference frequency can be reduced even when the oscillating frequency of an oscillator serving as a clock of the counter has a fluctuation from the reference frequency and a fluctuation due to the temperature change.

Moreover, in the embodiment, data is calculated and stored after a temperature test is performed in advance. For the reason, it is possible to estimate an operation temperature using the data.

With the temperature estimation circuit and the count value correction circuit according to at least one embodiment described in the foregoing, the temperature estimation and the correction of the count value in accordance with the oscillating characteristic fluctuation of the oscillator can be performed.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A temperature estimation circuit comprising:
a first oscillator to generate a first oscillating signal having a smaller temperature-related change rate of an oscillating frequency than a predetermined value and having a small temperature-related change;
a second oscillator to generate a second oscillating signal having an oscillating frequency linearly changing with respect to a temperature;
an enable period setting unit to set a count period for a predetermined number of oscillations of the first oscillating signal as an enable period;
a first counter to count the number of oscillations of the second oscillating signal during the enable period;
a first memory to store therein a count output value outputted from the first counter when a test at a first temperature is performed, as a first count value;
a second memory to store therein a count output value outputted from the first counter when a test at a second temperature is performed, as a second count value; and
an operation unit to execute a computation to calculate an operation temperature based on an operation-time count value outputted from the first counter during a normal operation, the first count value, and the second count value.

2. The temperature estimation circuit according to claim 1, wherein the operation unit includes:

a first subtracter to subtract the first count value from the second count value;
a second subtracter to subtract the first count value from the operation-time count value;
a divider to divide an output from the second subtracter by an output from the first subtracter;
a multiplier to multiply an output from the divider by a difference between the second temperature and the first temperature; and
a first adder to output a value obtained by adding the first temperature to an output from the multiplier as the operation temperature.

3. The temperature estimation circuit according to claim 1, wherein the predetermined value is 1%.

4. The temperature estimation circuit according to claim 1, wherein the temperature estimation circuit is a silicon semiconductor integrated circuit having a single chip or a silicon semiconductor integrated circuit having a plurality of chips.

5. The temperature estimation circuit according to claim 1, wherein the first memory and the second memory are nonvolatile semiconductor memory devices.

6. The temperature estimation circuit according to claim 1, wherein a count value being calculated by a temperature test in advance is stored.

7. A count value correction circuit comprising:
a first oscillator to generate a first oscillating signal having a smaller temperature-related change rate of an oscillating frequency than a first predetermined value and having a small temperature-related change;
a second oscillator to generate a second oscillating signal having an oscillating frequency linearly changing with respect to a temperature;
an enable period setting unit to set a count period for a predetermined number of oscillations of the first oscillating signal as an enable period;
a first counter to count the number of oscillations of the second oscillating signal during the enable period;
a first memory to store therein a count output value outputted from the first counter when a test at a first temperature is performed, as a first count value;
a second memory to store therein a count output value outputted from the first counter when a test at a second temperature is performed, as a second count value;
an operation unit to executes a computation to calculate an operation temperature based on an operation-time count value outputted from the first counter during a normal operation, the first count value, and the second count value;
a second counter to count the number of oscillations of the first oscillating signal;
a first selector to select either one of the second oscillating signal and a third oscillating signal
having a smaller temperature-related change rate of the oscillating frequency than a second predetermined value and having a small temperature-related change, and output the selected signal to the first counter;
a third memory to store therein the count output value outputted from the first counter during the enable period as a third count value when the test at the first temperature is performed and the first selector selects the third oscillating signal;
a fourth memory to store therein the count output value outputted from the first counter during the enable period as a fourth count value when the test at the second temperature is performed and the first selector selects the third oscillating signal;
an oscillation characteristic estimation unit to estimate a reference oscillating frequency of the first oscillator at a reference temperature and a temperature coefficient of the reference oscillating frequency, based on the third count value and the fourth count value;
a correction value table in which a correction value is described for each of the temperatures, the correction value being a value used to correct a shift of a count value of the second counter when the first oscillating signal fluctuates from the reference oscillating frequency; and
a correction unit to correct the count value of the second counter by reading out a correction value corresponding to a combination of the reference oscillating frequency and the temperature coefficient, and the operation temperature outputted from the operation unit, from the correction value table.

8. The count value correction circuit according to claim 7, wherein the operation unit includes:
a first subtracter to subtract the first count value from the second count value;
a second subtracter to subtract the first count value from the operation-time count value;
a divider to divide an output from the second subtracter by an output from the first subtracter;
a multiplier to multiply an output from the divider by a difference between the second temperature and the first temperature; and
a first adder to output a value obtained by adding the first temperature to an output from the multiplier as the operation temperature.

9. The count value correction circuit according to claim 7, wherein the first predetermined value and the second predetermined value are 1%.

10. The count value correction circuit according to claim 7, wherein the third oscillating signal is an oscillating signal inputted from an outside.

11. The count value correction circuit according to claim 7, wherein the count value correction circuit is a silicon semiconductor integrated circuit having a single chip or a silicon semiconductor integrated circuit having a plurality of chips.

12. The count value correction circuit according to claim 7, wherein the first to the fourth memories are nonvolatile semiconductor memory devices.

13. The count value correction circuit according to claim 7, wherein the second counter is a counter with a load function, and reads out data inputted at a data terminal when a load signal is inputted at a load terminal.

14. The count value correction circuit according to claim 13, wherein the correction unit includes:
a comparator to compare values for lower n bits (n is an integer of 2 or higher) in the second counter with values of all "1", and outputs a correspondence signal when the values for the lower n bits become the values of all "1";
a second selector to select a correction value in the correction value table when the comparator outputs the correspondence signal, and select a value of "0" when the comparator outputs no correspondence signal;
a second adder to add an output value of the second selector to the count value of the second counter;
a third adder to add a value of "1" to an output value of the second adder, and output the added value into a load terminal of the second counter; and
a correction value table read-out unit to read out a correction value corresponding to a combination of the reference oscillating frequency and the temperature coefficient, and the operation temperature outputted from the operation unit, from the correction value table.

15. The count value correction circuit according to claim 7, wherein the correction value for each temperature corresponding to the combination of the oscillating frequency and the temperature coefficient is described in the correction value table.

16. The count value correction circuit according to claim 7, wherein the correction unit performs the correction in a constant cycle.

17. The count value correction circuit according to claim 7, wherein a count value being calculated by a temperature test in advance is stored.

* * * * *